Patented Sept. 15, 1953

2,652,390

UNITED STATES PATENT OFFICE 2,652,390

POLYMERIZATION OF α-ACYLOXYACRYLO-NITRILES IN AQUEOUS SYSTEMS USING A REDOX CATALYST AND POLYMERS OBTAINED THEREFROM

Hugh J. Hagemeyer, Jr., Kingsport, Tenn., assignor to Eastman Kodak Company, Rochester, N. Y., a corporation of New Jersey No Drawing. Application August 18, 1950, Serial No. 180,297

12 Claims. (Cl. 260—80.5)

This invention relates to a new method for polymerizing α-acyloxyacrylonitriles, and more particularly α-acetoxyacrylonitrile, in aqueous systems.

The polymerization of α-acyloxyacrylonitriles, such as α-acetoxyacrylonitrile, alone or in the presence of other ethenoid monomers has been mentioned previously, although no methods whereby such polymerization could be effected have been described. (U. S. Patent 2,395,930, dated March 5, 1947 and U. S. Patent 2,266,771, dated December 25, 1941). In U. S. Application Serial No. 777,376, filed October 1, 1947, now U. S. Patent 2,537,881, issued January 9, 1951, of Joseph B. Dickey a method of mass polymerization of interpolymerization of α-acyloxyacrylonitriles is described, although no mention is made of simple emulsion polymerizations. The polymers obtained by the mass method are of little utility in the form obtained and must be purified by extraction and the like before obtaining a finished product, although such "mass" polymers can be used without treatment for the esterification methods described in Serial No. 777,376. Ordinary emulsion polymerization of α-acyloxyacrylonitriles, such as α-acetoxyacrylonitrile, is not practicable, since the rate of hydrolysis of the ester-nitrile exceeds its rate of polymerization under such conditions (see, for example, Deakin et al. "Jour. Chem. Soc." (London—1910), vol. 97, pp. 1968–1978), and yields of polymer are low.

The present invention provides a method for obtaining polymers of α-acyloxyacrylonitriles in pure form and in the substantial absence of hydrolysis products.

An object of my invention is to provide an improved method for preparing polymers of α-acyloxyacrylonitriles. A further object is to provide an improved method for polymerizing α-acetoxyacrylonitrile alone, or in the presence of another ethenoid monomer. Still another object is to provide new interpolymers of α-acyloxyacrylonitriles. Other objects will become apparent from a consideration of the following description and examples.

According to my invention I polymerize α-acyloxyacrylonitriles alone, or in the presence of another ethenoid monomer, in an aqueous dispersion in the presence of a persulfate polymerization catalyst and a water-soluble, oxidizable compound of sulfur.

The α-acyloxyacrylonitriles which I can use in practicing my invention can advantageously be represented by the following general formula:

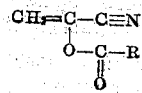

wherein R represents an alkyl group, such as methyl, ethyl, n-propyl, isopropyl, etc. groups (e. g. an alkyl group of the formula $C_nH_{2n+1}$ wherein $n$ represents a positive integer of from 1 to 3). Typical α-acyloxyacrylonitriles include α-acetoxyacrylonitrile, α-propionoxyacrylonitrile, α-n-butyroxyacrylonitrile, α-isobutyroxyacrylonitrile, etc.

The polymerization of one or more of the α-acyloxyacrylonitriles is effected according to my invention in an aqueous dispersion (i. e. solution, emulsion, or granular polymerization). Sufficient water can be used to dissolve the monomers, or if desired, the amount of water used can be adjusted to the extent that no water in excess of that required for complete solution is present. A dispersing agent can be added to produce a stable emulsion, or a granulating agent can be added, if desired, and the polymerization then effected. Typical emulsifying or dispersing agents include, for example, alkali metal dialkyl sulfosuccinates (e. g. sodium di-2-ethylhexylsulfosuccinate, sodium di-n-butylsulfosuccinate, sodium dioctyl sulfosuccinate, etc.), alkali metal alkyl-naphthalenesulfonates (e. g. sodium isopropylnaphthalenesulfonate, sodium isobutylnaphtholenesulfonate, etc.), alkali metal salts of long-chain alkyl sulfates (e. g. sodium lauryl sulfate, potassium stearyl sulfate, etc.), alkali metal salts of paraffin oil sulfonic acids (e. g. sodium paraffin oil sulfonate, etc.), alkali metal salts of long-chain alkylsulfonates (e. g. sodium laurylsulfonate, potassium stearylsulfonate, etc.), etc. Typical granulating agents include polyvinyl alcohol, partially hydrolyzed polyvinyl acetate, alkali metal polyacrylates and polymethacrylates (e. g. sodium polyacrylate, etc.), starch ethers (e. g. methylated starch), methyl cellulose, polyacrylamides, etc. The amount of emulsifying or granulating agent used can be varied, however, I have found that from about 0.1 to 1.0 per cent of such agents, based on the total weight of the monomers being polymerized, is sufficient, although up to about 5.0 per cent of such agents can be used, depending upon the dispersing power of the particular dispersing agent.

Persulfate polymerization catalysts which can advantageously be employed in practicing my invention include ammonium persulfate and alkali metal persulfates (e. g. sodium, potassium, lithium, etc. persulfates).

Water-soluble, oxidizable compounds of sulfur which can be used in practicing my invention comprise the well-known reducing agents of sulfur (i. e. compounds of sulfur having a valence of 2 or 4). Typical water-soluble, oxidizable compounds of sulfur include, for example, the alkali metal bisulfites (e. g. sodium, potassium, etc. bisulfites), ammonium bisulfite, alkali metal and ammonium sulfites (e. g. sodium, potassium, ammonium, etc. sulfites), alkali metal and ammonium thiosulfates (e. g. sodium, potassium, ammonium, etc. thiosulfates), alkali metal sulfides (e. g. sodium potassium, etc. sulfides), ammonium sulfides (e. g. ammonium sulfide, ammonium polysulfides, etc.), alkali metal hydrosulfides (e. g. sodium, potassium, etc. hydrosulfides), ammonium hydrosulfide, hydrogen sulfide, sulfur dioxide, organic sulfinic acids (e. g. p-toluenesulfinic acid, benzenesulfinic acid, xylenesulfinic acids [e. g. o-xylene-3-sulfinic acid, o-xylene-4-sulfinic acid, etc.], methanesulfinic acid, ethanesulfinic acid, ethanedisulfinic acid, etc.), or alkali metal salts of these sulfinic acids where the particular acid does not have sufficient solubility in water at the polymerization temperature, diethyl sulfite, diethylsulfoxide, etc. The term alkali metal as used herein is intended to define the metals of group I of the periodic table of the elements.

The persulfate polymerization catalyst is activated by the water-soluble compound of sulfur, which lowers the induction period proceeding the initiation of the polymerization. In the absence of these activators, little polymerization can be detected and the α-acyloxyacrylonitriles undergo extensive hydrolysis. Moreover, the organic acid liberated during hydrolysis inhibits the polymerization.

The activators are also useful in providing a convenient method for regulating the molecular weight of the polymers, the molecular weight being a function of the quantity of activator employed.

The quantity of persulfate catalyst can be varied, depending on the conditions of polymerization and the quantity of material being polymerized. Generally, I have found that from 0.1 to 4 per cent by weight, based on the materials being polymerized, is sufficient for the purposes of my invention. Especially useful polymers have been obtained when from about 1 to 2 per cent by weight of persulfate was employed. The quantity of water-soluble compound of sulfur used as an activator can be varied, and is generally a function of the materials being polymerized, temperature of polymerization, etc. Generally, from 0.5 to 7 molar equivalents of the activator for each molar equivalent of persulfate catalyst, are adequate for practicing the process of my invention. A more limited range which can be used is from 2 to 4 molar equivalents of the activator for each molar equivalent of the persulfate polymerization catalyst, especially where from 1 to 2 per cent by weight, based on the total weight of polymerizable materials present, of persulfate polymerization catalyst is used. Larger or smaller amounts of the activator can be used, if desired, although there is ordinarily no advantage in doing so. About 5 molar equivalents of activator for each equivalent of persulfate has been found to give especially useful results.

Heat accelerates the polymerization and temperatures varying from about 25° to 90° C. have been found to be useful. Temperatures as low as about 0° C. can be used, as shown in the examples below.

While the process of my invention is especially useful for the homopolymerization of α-acryloxyacrylonitriles, it can also be used advantageously for the interpolymerization of α-acyloxyacrylonitriles with one or more compounds containing ethenoid unsaturation, i. e. compounds containing an acyclic —CH=C< group, such as, for example, vinyl acetate, vinyl propionate, vinyl butyrate, vinyl isobutyrate, vinyl benzoate, divinyl phthalate, vinyl chloroacetate, methyl acrylate, ethyl acrylate, n-propyl acrylate, isopropyl acrylate, n-butyl acrylate, isobutyl acrylate, secondary butyl acrylate, methyl α-methacrylate, ethyl α-methacrylate, propyl α-methacrylate, isopropyl α-methacrylate, n-butyl α-methacrylate, isobutyl α-methacrylate, secondary butyl α-methacrylate, benzyl acrylate, benzyl α-methacrylate, vinyl chloride, vinylidene chloride, styrene, α-methylstyrene, α-acetoxystyrene, α-chlorostyrene, p-acetaminostyrene, p-sulfamylstyrene, isopropenyl acetate, isopropenyl propionate, methyl α-chloroacrylate, ethyl α-chloroacrylate, n-propyl α-chloroacrylate, acrylamide, N-methyl acrylamide, N-ethyl acrylamide, N,N-diethyl acrylamide, α-methacrylamide, acrylonitrile, α-methacrylonitrile, dimethyl fumarate, diethyl fumarate, di-n-propyl fumarate, diisopropyl fumarate, di-n-butyl fumarate, dimethyl maleate, diethyl maleate, di-n-propyl maleate, diisopropyl maleate, di-n-butyl maleate, dibenzyl fumarate, dibenzyl maleate, diallyl fumarate, dimethallyl fumarate, diallyl maleate, dimethallyl maleate, methyl vinyl ketone, ethyl vinyl ketone, n-propyl vinyl ketone, n-butyl vinyl ketone, methyl isopropenyl ketone, ethyl isopropenyl ketone, divinyl ketone, diisopropenyl ketone, β-chloroallyl acetate, methyl α-chloroacrylate, β-chloro-α-methallyl acetate, maleic anhydride, α-chloroacrylonitrile, vinyl sulfonamide, α-methyl vinyl sulfonamide, maleic imide, N-butyl maleic imide, α-chloroacrylic acid, acrylic acid, α-methacrylic acid, maleic acid, fumaric acid, fumaronitrile, maleic nitrile, itaconic acid, citraconic acid, methyl itaconate, ethyl itaconate, and the like.

Following the polymerization, the polymer products are washed well with water and then dried. Interpolymers of the α-acyloxyacrylonitriles and acrylonitrile containing from 50 to 95 per cent by weight of acrylonitrile in the polymer molecule give clear, viscous solutions in solvents for polyacrylonitrile, such as N,N-dimethylformamide, N,N-dimethylacetamide, γ-butyrolactone, ethylene carbamate, ethylene carbonate, N-methyl-2-pyrrolidone, etc. These viscous solutions containing from 10 to 30 per cent by weight of polymer can be extruded through an orifice into a coagulating bath containing a liquid, such as water, alcohols, etc. which is a non-solvent for the polymer. The resulting filaments can be stretched or drafted from 100 to 1400 per cent, dried, relaxed, and twisted to give yarns characterized by good strength, elasticity, and dyeing properties.

Ternary interpolymers comprising an α-acyloxyacrylonitrile (e. g. α-acetoxyacrylonitrile), acrylonitrile, and isopropenyl acetate have been found to be especially useful as raw materials for the preparation of fibers and yarns, films, tapes, etc. Interpolymers containing from 5 to 90 per cent by weight of the α-acyloxyacrylonitrile, 5 to 90 per cent by weight of acrylonitrile, and 5 to 30 per cent by weight of isopropenyl acetate are particularly suitable for such purposes.

The following examples will serve to illustrate more fully the manner whereby I practice my invention.

*Example 1.—Homopolymerization of α-acetoxyacrylonitrile*

350 cc. of distilled water having dissolved therein 1.0 g. of ammonium persulfate and 2.0 g. of sodium bisulfite were stirred while 10.0 g. of sodium dioctyl sulfosuccinate were added. The solution was then stirred at 2°-6° C. while 65 g. of α-acetoxyacrylonitrile (B. P. 61° C./10 mm., $N_D^{20}$ 1.4260) were run in over a period of two hours, at the end of which time a white emulsion had formed. After allowing the reaction mixture to stand for two hours, it was poured into one liter of 25 per cent aqueous ethanol and allowed to stand overnight. The emulsion became thick and creamy, and the suspended polymer was coagulated by adding 5 g. of sodium chloride, two drops of sulfuric acid, and heating with stirring. The solid phase became yellow and the water phase orange. The polymer was collected on a Buchner funnel, washed with water, and air and oven-dried to give 45 g. (69 per cent) of tan solid.

Example 2.—Homopolymerization of α-acetoxyacrylonitrile

This example was performed in the same manner as Example 1, except that polymerization was effected at 25° C. and no emulsifying agent was employed. The solution, after polymerization for three hours was poured into 300 cc. of dilute sodium chloride solution, but the coagulum could not be filtered. The coagulum was then heated on a steam bath for two hours, and the cream-colored polymer coagulated. It was filtered on a Buchner funnel and washed three times with water. There were thus obtained 30 g. (47 per cent) of dry polymer consisting of tan powder and lumps. It was soluble in N,N-dimethylformamide.

Example 3.—Interpolymer of α-acetoxyacrylonitrile and acrylonitrile

In a three-liter flask were placed 1400 cc. of distilled water, which was heated to 35° C. before adding 1.0 g. of ammonium persulfate, 1.0 g. of sodium bisulfite, 96 g. of freshly distilled acrylonitrile ($N_D^{20}$ 1.3920), and 4.0 g. of redistilled α-acetoxyacrylonitrile. The flask was then purged with nitrogen gas, and the contents stirred for six hours while the temperature was maintained at 35° C. During the first hour it was necessary to cool externally. The white polymer slurry which formed was filtered, and washed with water. After drying, the white powder weighed 94 g. (94 per cent), and it was soluble in N,N-dimethylacetamide. It gave a viscous solution in N,N-dimethylformamide having a relative viscosity of 1.48. Fibers spun from this solution had a strength of 3.34 grams per denier, 20 per cent elongation at break, a wet strength of 3.52 grams per denier and a 20 per cent elongation when wet.

Example 4.—Interpolymer of α-acetoxyacrylonitrile, isopropenyl acetate, and acrylonitrile In the same manner as described in Example 3 above, 1400 cc. of water, 1.0 g. of ammonium persulfate, 1.0 g. of sodium bisulfite, 90 g. of acrylonitrile, 5.0 g. of isopropenyl acetate, and 5.0 g. α-acetoxyacrylonitrile were added to a three-liter flask. The polymerization was effected at a temperature of from 40° C. to 44° C. over a period of twenty hours. The white slurry was then coagulated by adding one liter of water containing 50 g. of aluminum sulfate and about 250 cc. of acetone. After collecting the polymer on a Buchner funnel, it was washed well with water and dried. It weighed 97 g. (97 per cent) and gave a viscous solution in N,N-dimethylformamide having a relative viscosity of 1.489. A multifilament yarn spun by extruding the solution into an isopropanol bath, followed by drafting of the filaments in hot air, had a strength of 2.58 grams per denier and an elongation of 23 per cent. When wet, the yarn had a strength of 2.26 grams per denier and an elongation of 28 per cent.

In like manner, 80.0 g. of acrylonitrile, 10.0 g. of isopropenyl acetate and 10.0 g. of α-acetoxyacrylonitrile were polymerized together. An 84 per cent yield of polymer was obtained after 24 hours at 35°-38° C. Yarns spun by extruding a solution of the polymer in N,N-dimethylformamide into a precipitating bath had an excellent affinity for cellulose acetate dyes.

In the manner described in Example 3 above, acrylonitrile and α-acetoxyacrylonitrile were interpolymerized in the amounts given in the table below. The reaction mixtures were heated for the times and at the temperatures indicated, and the polymers were washed and dried as described in Example 3. The yields of polymers are set forth in the table. Each of the polymer products was then dissolved in separate portions of N,N-dimethylformamide, and the resulting solutions spun into coagulating baths. The properties of the fibers formed are summarized below.

| Example No. | Monomeric Mixture | | Time, Hrs. | Temp., °C. | Yield, percent | Fiber Properties | | | |
|---|---|---|---|---|---|---|---|---|---|
| | | | | | | Dry | | Wet | |
| | Percent AN | Percent AAN | | | | g./d. | Percent E | g./d. | Percent E |
| 5 | 94 | 6 | 7.0 | 35 | 90 | 2.70 | 21.3 | 2.89 | 23.7 |
| 6 | 90 | 10 | 17.0 | 35–43 | 100 | 3.26 | 21.3 | 2.74 | 23.7 |
| 7 | 85.3 | 14.7 | 23.0 | 40–42 | 100 | 2.81 | 30.0 | 1.99 | 25.0 |
| 8 | 80 | 20 | 22.0 | 40–42 | 97 | 2.02 | 29.2 | 1.86 | 36.0 |
| 9 | 75 | 25 | 6.5 | *40–44 | 90 | 2.06 | 45.0 | 1.98 | 50.7 |
| 10 | 70 | 30 | 23.0 | 40–49 | 96 | | | | |
| 11 | 50 | 50 | 22.0 | 35–43 | 93 | | | | |
| 12 | 40 | 60 | 16.0 | 28–39 | 88 | | | | |
| 13 | 30 | 70 | 20.0 | 40–51 | 76 | | | | |

AN = Acrylonitrile.
AAN = α-Acetoxyacrylonitrile.
g./d. = Grams per denier.
E = Elongation.
*= The temperature on this sample was allowed to drop from 44° C. to 26° C. over a period of 16.5 hrs. before processing.

By replacing the α-acetoxyacrylonitrile used in the above examples by a molecularly equivalent amount of other α-acyloxyacrylonitriles, e. g. α-propionoxyacrylonitrile, α-isobutyroxyacrylonitrile, α-n-butyroxyacrylonitrile, etc., other useful polymers can be obtained.

The water-soluble, oxidizable compounds of sulfur, which must be employed for successful operation of my invention, are well recognized in the art as reducing agents, the valence of the sulfur being either 2 or 4. In the preparation of interpolymers I have found that, in general, it is advantageous to have the monomeric mixture contain from 5 to 95 per cent by weight of the α-acyloxyacrylonitrile, the remainder being another polymerizable compound, although these amounts can be varied according to the proposed use to which the polymer is to be adapted.

What I claim as my invention and desire secured by Letters Patent of the United States is:

1. A process for preparing polymers of α-acyloxyacrylonitriles in the substantial absence of hydrolysis thereof comprising polymerizing an α-acyloxyacrylonitrile represented by the following general formula:

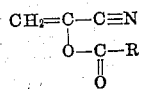

wherein R represents an alkyl group of the formular $C_nH_{2n+1}$ wherein $n$ represents a positive integer of from 1 to 3, in an aqueous dispersion in the presence of a persulfate polymerization catalyst and a water-soluble, oxidizable compound of sulfur.

2. A process for preparing polymers of α-acyloxyacrylonitriles in the substantial absence of hydrolysis thereof comprising polymerizing an α-acyloxyacrylonitrile represented by the following general formula:

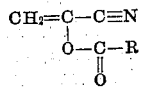

wherein R represents an alkyl group of the formula $C_nH_{2n+1}$ wherein $n$ represents a positive integer of from 1 to 3, in an aqueous dispersion in the presence of a persulfate polymerization catalyst and a water-soluble, alkaline bisulfite.

3. A process for preparing polymers of α-acyloxyacrylonitriles in the substantial absence of hydrolysis thereof comprising polymerizing an α-acyloxyacrylonitrile represented by the following general formula:

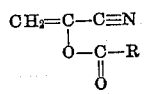

wherein R represents an alkyl group of the formula $C_nH_{2n+1}$ wherein $n$ represents a positive integer of from 1 to 3, in an aqueous dispersion in the presence of a persulfate polymerization catalyst and a water-soluble, alkaline thiosulfate.

4. A process for preparing polymers of α-acetoxyacrylonitrile in the substantial absence of hydrolysis thereof comprising polymerizing α-acetoxyacrylonitrile in an aqueous dispersion in the presence of a persulfate polymerization catalyst and a water-soluble, oxidizable compound of sulfur.

5. A process for preparing polymers of α-acetoxyacrylonitrile in the substantial absence of hydrolysis thereof comprising polymerizing α-acetoxyacrylonitrile in an aqueous dispersion in the presence of a persulfate polymerization catalyst and sodium bisulfite.

6. A process for preparing polymers of α-acetoxyacrylonitrile in the substantial absence of hydrolysis thereof comprising polymerizing α-acetoxyacrylonitrile in an aqueous dispersion in the presence of a persulfate polymerization catalyst and potassium bisulfite.

7. A process for preparing polymers of α-acetoxyacrylonitrile in the substantial absence of hydrolysis thereof comprising polymerizing α-acetoxyacrylonitrile in an aqueous dispersion in the presence of a persulfate polymerization catalyst and sodium thiosulfate.

8. A process for preparing polymers of α-acetoxyacrylonitrile in the substantial absence of hydrolysis thereof comprising polymerizing α-acetoxyacrylonitrile in an aqueous dispersion in the presence of ammonium persulfate and sodium bisulfite.

9. A process for preparing polymers of α-acetoxyacrylonitrile in the substantial absence of hydrolysis thereof comprising polymerizing α-acetoxyacrylonitrile in an aqueous dispersion in the presence of ammonium persulfate and potassium bisulfite.

10. A process for preparing polymers of α-acetoxyacrylonitrile in the substantial absence of hydrolysis thereof comprising polymerizing α-acetoxyacrylonitrile in an aqueous dispersion in the presence of ammonium persulfate and sodium thiosulfate.

11. A ternary interpolymer containing from 5 to 90 per cent by weight of an α-acyloxyacrylonitrile represented by the following general formula:

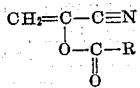

wherein R represents an alkyl group of the formula $C_nH_{2n+1}$ wherein $n$ represents a positive integer of from 1 to 3, 5 to 90 per cent by weight of acrylonitrile, and from 5 to 30 per cent by weight of isopropenyl acetate.

12. A ternary interpolymer containing from 5 to 90 per cent by weight of α-acetoxyacrylonitrile, 5 to 90 per cent by weight of acrylonitrile, and from 5 to 30 per cent by weight of isopropenyl acetate.

HUGH J. HAGEMEYER, Jr.

References Cited in the file of this patent

UNITED STATES PATENTS

| Number | Name | Date |
| --- | --- | --- |
| 2,395,930 | Johnston et al. | Mar. 5, 1946 |
| 2,453,824 | Wood | Nov. 16, 1948 |
| 2,462,354 | Brubaker | Feb. 22, 1949 |
| 2,475,423 | Dickey | July 5, 1949 |
| 2,537,881 | Dickey | Jan. 9, 1951 |